(12) United States Patent
Hosokawa

(10) Patent No.: US 10,783,471 B2
(45) Date of Patent: Sep. 22, 2020

(54) OPERATING PROCEDURE GENERATION SUPPORT APPARATUS, OPERATING PROCEDURE GENERATION SUPPORT METHOD AND NON-TRANSITORY COMPUTER READABLE MEDIUM

(71) Applicant: KABUSHIKI KAISHA TOSHIBA, Tokyo (JP)

(72) Inventor: Akira Hosokawa, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 503 days.

(21) Appl. No.: 15/264,084

(22) Filed: Sep. 13, 2016

(65) Prior Publication Data

US 2017/0243148 A1 Aug. 24, 2017

(30) Foreign Application Priority Data

Feb. 18, 2016 (JP) .................. 2016-029130

(51) Int. Cl.
G06Q 10/06 (2012.01)
G06Q 10/00 (2012.01)

(52) U.S. Cl.
CPC ....... G06Q 10/06316 (2013.01); G06Q 10/20 (2013.01)

(58) Field of Classification Search
CPC ............. G06Q 10/6316; G06Q 10/20
See application file for complete search history.

(56) References Cited

U.S. PATENT DOCUMENTS 6,957,186 B1 * 10/2005 Guheen .................. G06Q 99/00
705/323
8,781,882 B1 * 7/2014 Arboletti ............ G06Q 10/0639
705/7.39

(Continued)

FOREIGN PATENT DOCUMENTS

JP 2001-265756 9/2001
JP 2009-15511 1/2009

(Continued)

*Primary Examiner* — Sujay Koneru
(74) *Attorney, Agent, or Firm* — Finnegan, Henderson, Farabow, Garrett & Dunner, L.L.P.

(57) ABSTRACT

An operating procedure generation support apparatus according to embodiments of the present invention includes a property acquirer, an additional operating procedure candidate generator, and an output device. The property acquirer acquires non-associated properties, according to product description specifications including a product family and properties of the product family, standard operating procedures pre-associated with the product family and the properties, and a basic operating procedure specified from among the standard operating procedures, the non-associated properties being the properties of the product family and having values not updated by the basic operating procedure. The additional operating procedure candidate generator generates standard operating procedures as additional operating procedure candidates, according to the product description specifications, the standard operating procedures, and properties specified from among the non-associated properties, the generated standard operating procedures being capable of updating values of the specified properties. The output device outputs the additional operating procedure candidates.

10 Claims, 15 Drawing Sheets

(56) References Cited

U.S. PATENT DOCUMENTS

| | | | | |
|---|---|---|---|---|
| 2001/0034756 | A1* | 10/2001 | Kan | G06Q 10/10 709/203 |
| 2002/0169646 | A1* | 11/2002 | Casserly | G06Q 10/06 700/99 |
| 2003/0163219 | A1* | 8/2003 | Flesher | G09B 19/003 700/185 |
| 2004/0034556 | A1* | 2/2004 | Matheson | B61L 27/0016 705/7.24 |
| 2007/0106420 | A1* | 5/2007 | Wyrwoll | B29C 45/76 700/200 |
| 2007/0142958 | A1* | 6/2007 | Hu | G05B 19/4097 700/159 |
| 2008/0016123 | A1* | 1/2008 | Devraj | G06F 16/217 |
| 2010/0169760 | A1* | 7/2010 | Hosokawa | G06F 9/4492 715/227 |
| 2012/0072462 | A1* | 3/2012 | Gu | G06Q 30/0625 707/797 |
| 2012/0159389 | A1* | 6/2012 | Keith | G06Q 10/00 715/810 |
| 2013/0005380 | A1* | 1/2013 | Nobukiyo | H04W 72/06 455/512 |
| 2013/0204847 | A1* | 8/2013 | Murayama | H02J 3/00 707/691 |
| 2014/0358625 | A1* | 12/2014 | Shimizu | G06Q 10/06375 705/7.27 |
| 2015/0134289 | A1* | 5/2015 | Mrvaljevic | G01D 18/008 702/85 |
| 2015/0312427 | A1* | 10/2015 | Roulland | H04N 1/00344 358/1.15 |
| 2017/0146986 | A1* | 5/2017 | Libal | G05B 19/0428 |
| 2017/0243148 | A1* | 8/2017 | Hosokawa | G06Q 10/06316 |

FOREIGN PATENT DOCUMENTS

| | | |
|---|---|---|
| JP | 2011-167801 | 9/2011 |
| JP | 2013-97443 | 5/2013 |
| JP | 2013-127656 | 6/2013 |
| JP | 2015-106789 | 6/2015 |

* cited by examiner

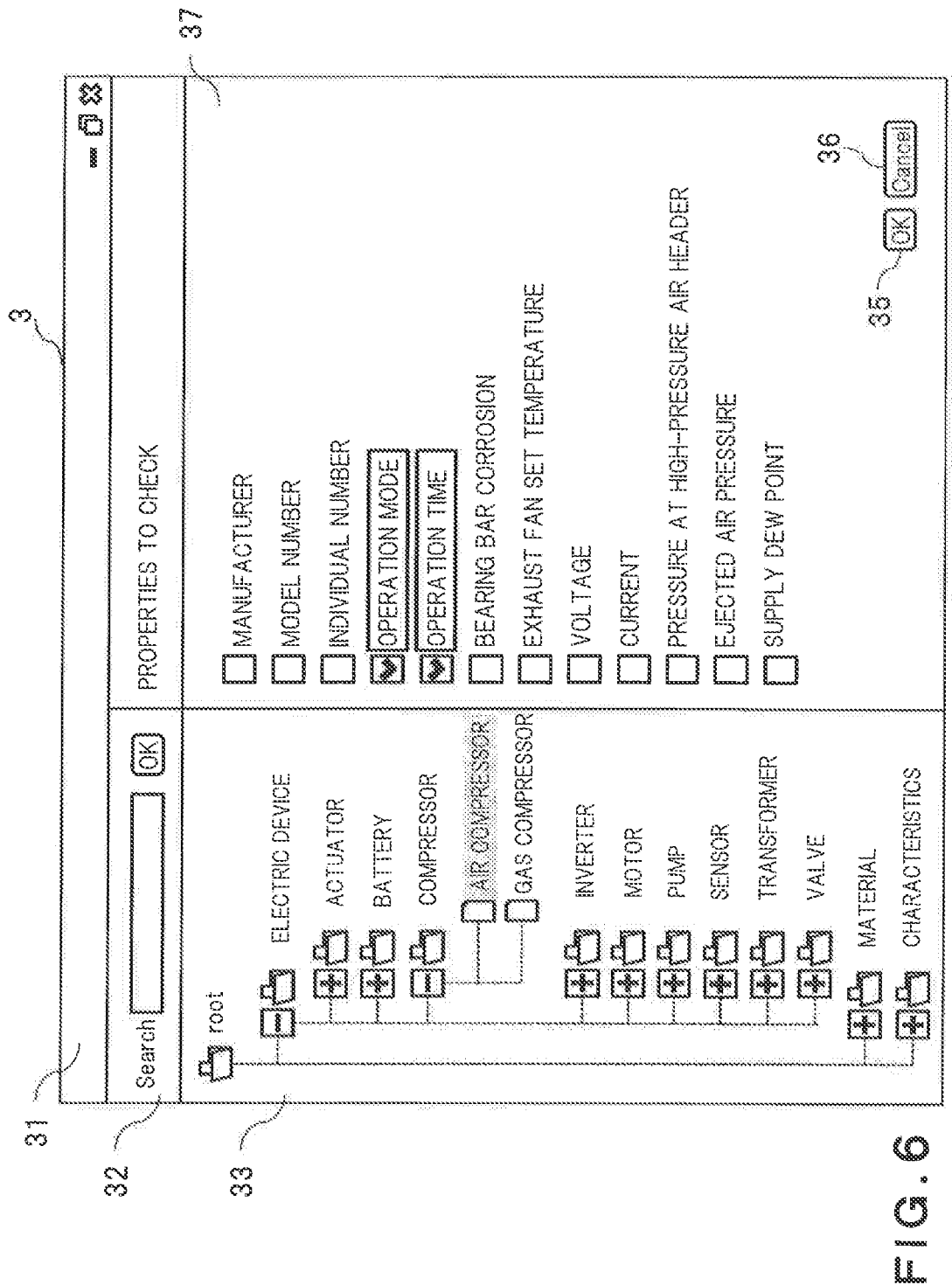
F I G. 6

OPERATING PROCEDURE GENERATION SUPPORT APPARATUS, OPERATING PROCEDURE GENERATION SUPPORT METHOD AND NON-TRANSITORY COMPUTER READABLE MEDIUM

CROSS-REFERENCE TO RELATED APPLICATION(S)

This application is based upon and claims the benefit of priority from Japanese Patent Application No. 2016-029130, filed Feb. 18, 2016; the entire contents of which are incorporated herein by reference.

FIELD

Embodiments described herein relate generally to an operating procedure generation support apparatus, an operating procedure generation support method and a non-transitory computer readable medium.

BACKGROUND

In order that every operator performs the maintenance of facilities and equipment or product inspection with the same quality, an operating procedure should be standardized and the standardized operating procedure should be shared. The standardized operating procedure should preferably be managed in a database or the like and readable by a computer. However, even facilities and equipment of the same type may require checking of different properties, depending on their installation states, their ages of service, and their operations. It is therefore necessary to appropriately adjust the operating procedure.

If the operating procedure is freely changed by each operating departments or companies, the quality ensured by the standard operating procedure may be lost. Besides, if an operation is modified or extended in one department, the operators in another department cannot easily operate the same operation. Moreover, the execution of operations which are not common among the departments is undesirable in that it cannot make use of data, for example, for analyzing an operating history. Thus, the adjustment of the operating procedure is needed but the adjustment may cause defects.

BRIEF DESCRIPTION OF THE DRAWINGS

FIG. 6 is a diagram illustrating an example of the output of properties;

DETAILED DESCRIPTION

An operating procedure generation support apparatus according to embodiments of the present invention includes a property acquirer, an additional operating procedure candidate generator, and an output device. The property acquirer acquires non-associated properties, according to product description specifications including a product family and its properties, standard operating procedures pre-associated with the product family and its properties, and a basic operating procedure specified from among the standard operating procedures, the non-associated properties being the properties of the product family and having values not updated through the basic operating procedure. The additional operating procedure candidate generator generates standard operating procedures as additional operating procedure candidates, according to the product description specifications, the standard operating procedures, and specified properties specified from among the non-associated properties, the generated standard operating procedures being capable of updating values of the specified properties. The output device outputs the additional operating procedure candidates.

According to the embodiment, the operating procedure generation support apparatus facilitates to generate an extended operating procedure.

Below, a description is given of embodiments of the present invention with reference to the drawings. The present invention is not limited to the embodiments.

First Embodiment

Figure 1:
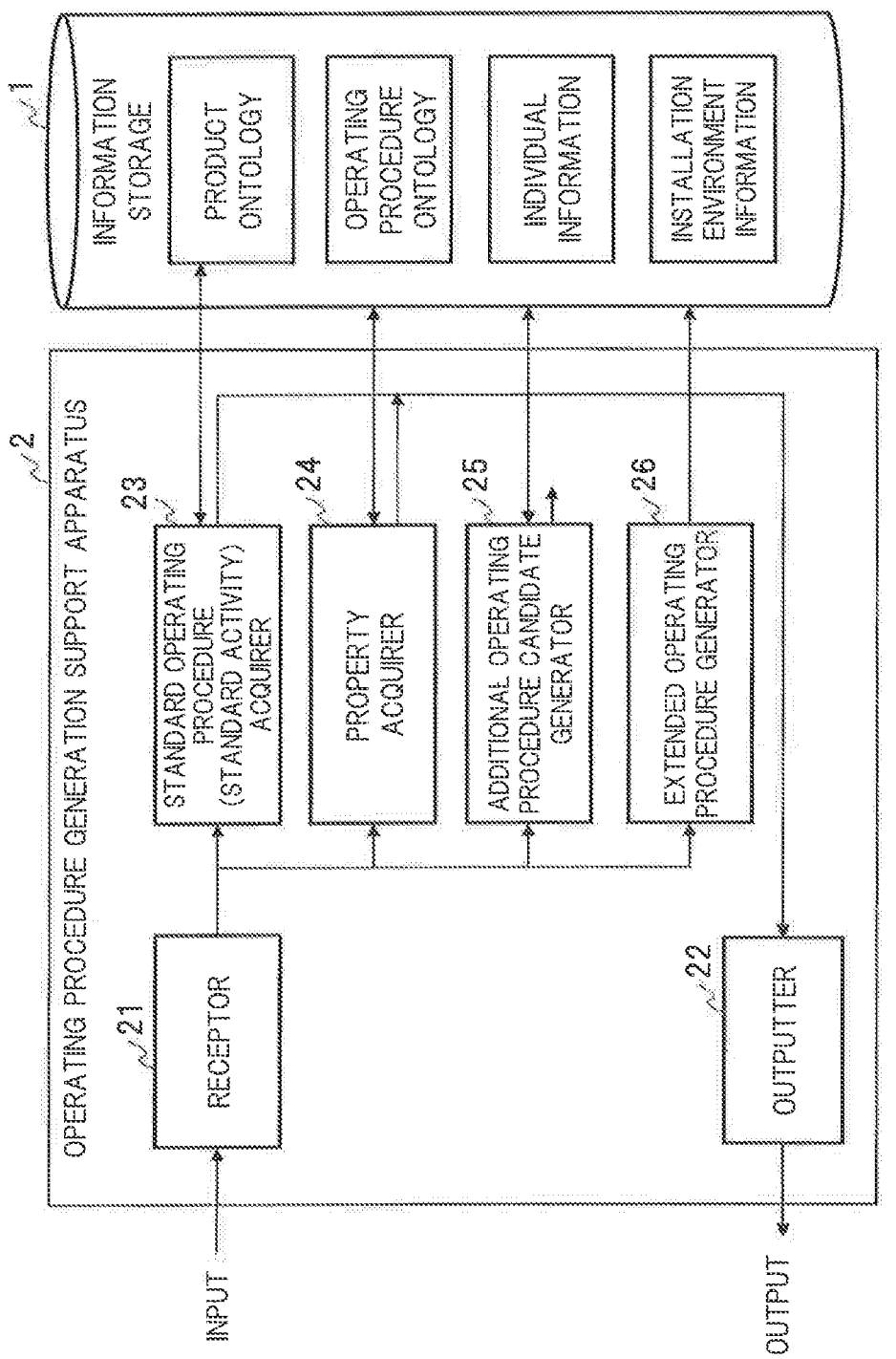
FIG. 1 is a block diagram schematically illustrating the structure of an operating procedure generation support apparatus according to the first embodiment.

FIG. 1 is a block diagram schematically illustrating the structure of an operating procedure generation support apparatus according to the first embodiment. The operating procedure generation support apparatus in FIG. 1 includes an information storage 1 and an operating procedure generation supporter 2. The operating procedure generation supporter 2 includes a receptor 21, an outputter (output device) 22, a standard operating procedure (standard activity) acquirer 23, a property acquirer 24, an additional operating procedure candidate generator 25, and an extended operating procedure generator 26.

It should be noted that the information storage 1 may be an outside device of the operating procedure generation support apparatus. In this case, data communication between the information storage 1 and the operating procedure generation support apparatus can be done directly or indirectly, e.g. via a network.

The information storage 1 stores information used by the operating procedure generation supporter 2. Suppose here that the information storage 1 stores product ontology, operating procedure ontology, installation environment information, and individual information. Note that the information storage 1 may store any other information. Ontology indicates, for example, a relationship between concepts or a relationship between a concept and a concrete example. Here, ontology associates a concept with a class (product family), a property, an activity (operating procedure), and the like described later and indicates relationships therebetween.

Figure 2:
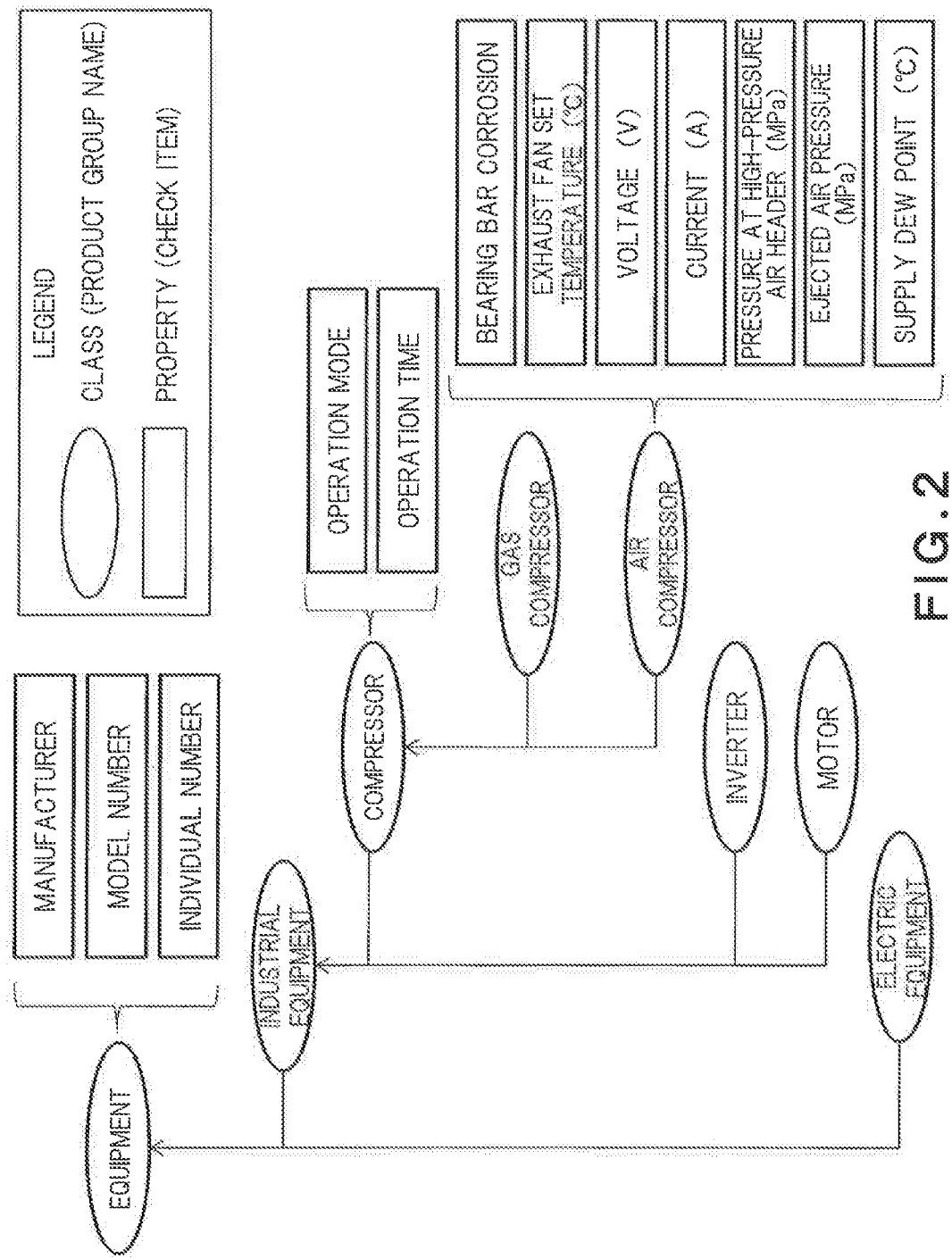
FIG. 2 is a diagram illustrating an example of the structure of product ontology.

FIG. 2 is a diagram illustrating an example of the structure of a product ontology. A product ontology refers to product description specifications consisting basically of classes and their properties which characterize the classes. It should be noted that the classes and the properties are identified by their names in FIG. 2, but this is not necessarily the case. For example, each class and property may be identified by a string of meaningless characters and an identifier indicating version information.

An ancestor class has a more abstract (summary) name, and a descendant class has a more specific (specialized) name. Each class in the product ontology can have one or more child classes that represent more concrete concepts of the class. For example, as illustrated in FIG. 2, the "compressor" class can have child classes, such as "gas compressor" and "air compressor", representing a more concrete concept than the "compressor" class.

Since the compressor is a type of industrial equipment, "compressor" has the ancestor class "industrial equipment". It should be noted that each child class can have only one parent class that has a more abstract name than that class. The structure of the product ontology is therefore a tree structure in FIG. 2 that has the highest class as a root. In FIG. 2, the class "equipment" is the root class.

It should be noted that the position and name of each class is predetermined.

A property here refers particularly to an item to be checked when a product belonging to the corresponding class undergoes operation. It should be noted that one class may have a plurality of properties. In FIG. 2, the "equipment" class has three properties, "manufacturer", "model number" and "individual number". The "compressor" class has two properties, "operation mode" and "operation time". The "air compressor" class has seven properties, "bearing bar corrosion", "exhaust fan set temperature", "voltage", "current", "pressure at high-pressure air header", "ejected air pressure" and "supply dew point temperature".

A feature of the structure of the product ontology is that all properties of a parent class are inherited to its child classes. For example, the above-described three properties of the "equipment" class are inherited to its two child classes "industrial equipment" and "electric equipment". The inherited properties can also be used in these classes. The properties inherited from the parent class to the child classes are further inherited to the child classes of that child classes (i.e., grandchild class). For example, the three properties of the "equipment" class are inherited not only to its child class "industrial equipment" but also to its grandchild classes "compressor", "inverter", and "motor", so that the three properties can be used in its grandchild classes. For example, although not shown in the drawing, the "air compressor" class has the 12 properties in total which consist of its native seven properties, the three properties inherited from its ancestor class "equipment", and the two properties inherited from its ancestor class "compressor".

FIG. 2 depicts a tree structure showing parent-child relationships between the classes. However the tree structure may be a "partial inheritance" structure in which some of properties can be given from other branches in the tree structure, as in the partial inheritance relationship according to the international standard ISO13584-42/IEC61360-2.

The operating procedure ontology will now be described. The operating procedure ontology consists of activities indicating operating procedures. Each activity is pre-associated with the corresponding class in the product ontology. Here, each activity associated with a class is referred to as the standard activity (a standard operating procedure) of that class.

Figure 3:
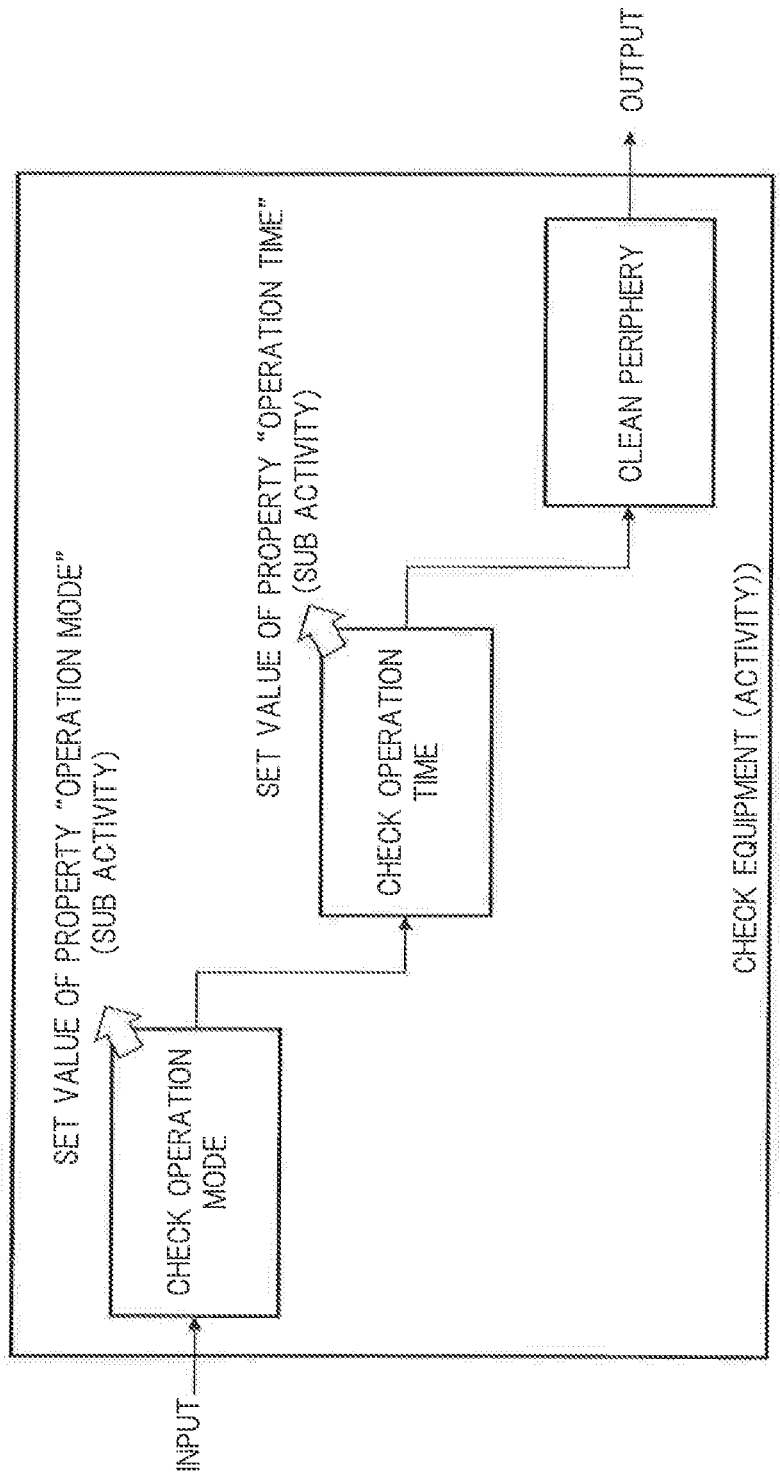
FIG. 3 is a diagram illustrating an example of the structure of operating procedure ontology.

FIG. 3 is a diagram illustrating an example of the structure of operating procedure ontology. FIG. 3 illustrates the activity "check equipment", which is the standard activity of the "compressor" class, in an ICAM Definition (IDEF) 0 diagram which is a diagram in functional modeling language.

IDEF0 consists of two basic components: "activities", each representing one function or activity, and "arrows" each representing a relationship between functions or operations. Each activity is illustrated in a box, and each arrow is illustrated in the form of an arrow.

Each activity can be separated into a plurality of small activities which are referred to as the "sub activities" of the original activity. Referring to FIG. 3, the "check equipment" activity consists of three sub activities "check operation mode", "check operation time", and "clean periphery".

Arrows input and output to/from an activity are input and output to/from its sub activities. The sub activities to/from which arrows extend represent the former and the latter of activities of the operating procedure.

In FIG. 3, the "check equipment" activity has one input and one output. The input is represented as the input of the "check operation mode" activity, and the output is represented as the output from the "clean periphery" activity.

It is assumed that sub activities which make up each activity and the order of the sub activities are predetermined and that the sub activities and the order cannot be edited by users except the administrator. Thereby, the quality of the activities is ensured. In addition, each sub activity may further include sub activities.

This example provides one input and one output, but a plurality of inputs and outputs may be provided and the numbers of inputs and outputs may be different. Moreover, this example provides only two types of arrows representing an input and an output for the convenience of description but may further include two other arrows defined by IDEF0: a control and a mechanism. In addition, each activity can be extended similar to the above-described product ontology according to IEC62656-5 which is an international standard giving specifications for expressing activities as ontology by use of a spread sheet.

Figure 4:
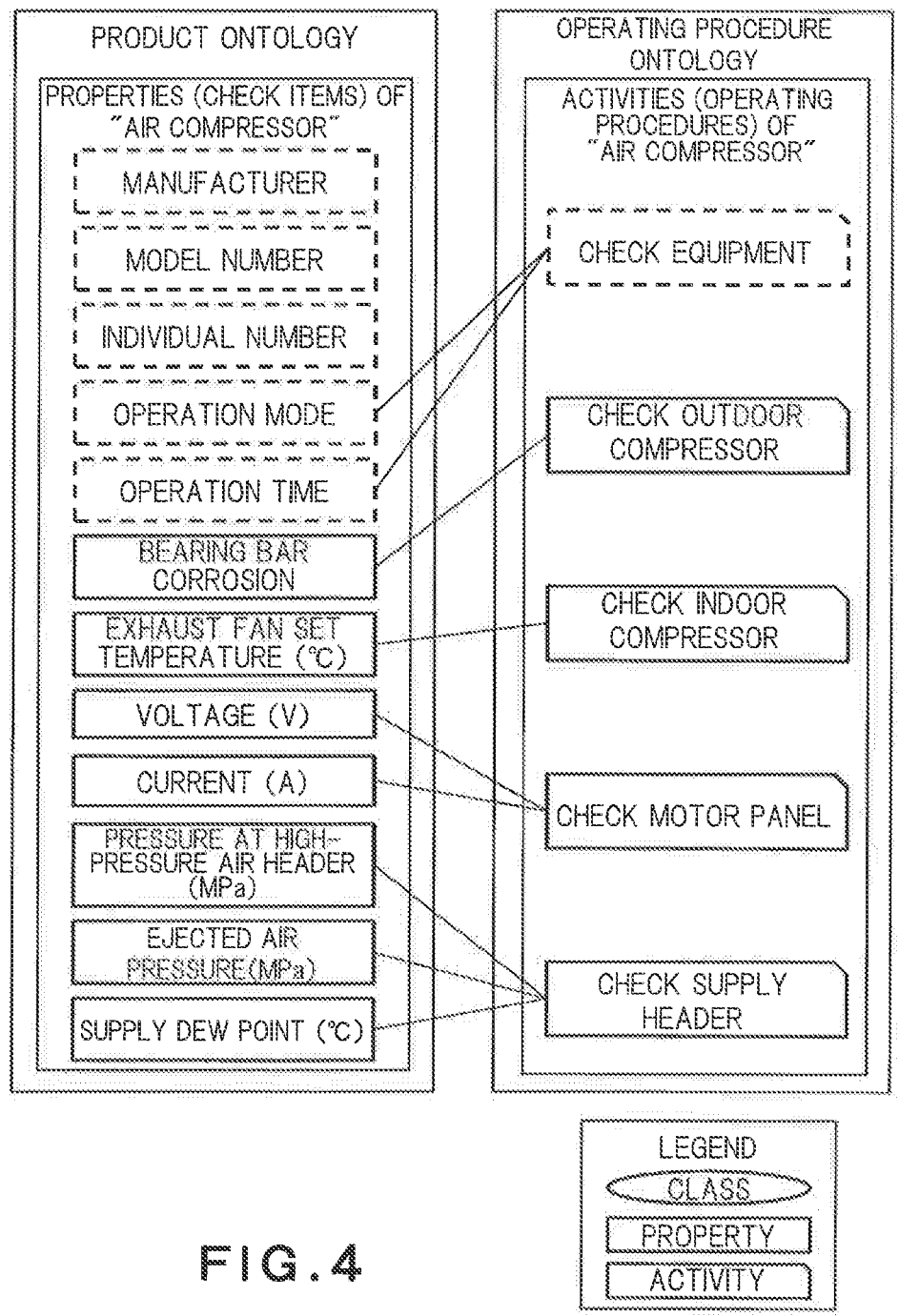
FIG. 4 is a diagram illustrating an example of relationships between properties and activities.

Each activity is pre-associated with a class but is also related to a property. FIG. 4 is a diagram illustrating an example of relationships between properties and activities. In FIG. 4, relationships between the properties of the "air compressor" class in FIG. 2 and activities associated with the "air compressor" are illustrated.

Each solid line bridging a property and an activity in FIG. 4 indicates a relationship in which the activity linked to the property by the solid line updates the value of the property by the linked property. Here, upon the execution of an activity, the value of the property associated with the activity is updated.

The properties and activities in dotted rectangular boxes represent properties and activities inherited from the ancestor classes. In this manner, relationships between the properties and the activities of ancestor classes are inherited to descendant classes.

For example, as illustrated in FIG. 3, the "check equipment" activity associated with the "compressor" class, which is the ancestor class of the "air compressor", includes the sub activities "check operation mode" and "check operation time". The "check operation mode" sub activity updates the value of the property "operation mode". Further, the "check operation time" sub activity updates the value of the property "operation time". Therefore, it turns out that the "check equipment" activity updates the properties "operation mode" and "operation time". Accordingly, the properties "operation mode" and "operation time" are linked to the "check equipment" activity by solid lines.

As explained above, each activity is related to properties via sub activities thereof. It should be noted that there may be an activity that has no effect on any property, in other words, no relationship with any property, for example, the "clean periphery" sub activity of the "check equipment" activity in FIG. 3.

It should be noted that FIG. 4 partly omits the tree structure of the product ontology in FIG. 2 and only illustrates the "air compressor" class for the convenience of description, but other classes have relationships with the operating procedure ontology.

It should be noted that information on a relationship between a property and an activity may be regularly generated and the product ontology and the operating procedure ontology may be separately stored in the information storage 1. However, it is assumed that no such information is generated here.

The information storage 1 may store individual information. Individual information includes the values of the properties of individuals which are actual operation targets (operating objects). The product ontology includes general information on products. For example, a user such as operator can recognize that the properties of the "compressor" class are "operation mode" and "operation time", by reference to the product ontology. However, when the class is "compressor" and the actually installed first compressor and second compressor are present, the value of "operation mode" of the first compressor or the value of the "operation time" of the second compressor is not included in the product ontology. Such information on actual operation targets is included in the individual information.

The information storage 1 may also store installation environment information. The installation environment information relates to general installation environment for operation targets. The installation environment information may be data on building information modeling (BIM) which is three-dimensional information modeling of buildings.

The information stored in the information storage 1 may be pre-registered or registered through the receptor 21 or an inputter (input device) which is not illustrated.

The operating procedure generation supporter 2 will now be described. When a class associated with a product of operation targets is specified, the operating procedure generation supporter 2 outputs a standard operating procedure (standard activity) of the class (product family). A plurality of standard operating procedures may be associated with the class.

The operating procedure generation supporter 2 performs a process for acquiring properties related to the standard operating procedure specified from among the standard operating procedures. The operating procedure generation supporter 2 also performs a process for acquiring standard operating procedures (additional operating procedure candidates) related to properties (specified properties) specified from among the properties. The operating procedure generation supporter 2 &so performs a process for registering additional operating procedures specified from among the additional operating procedure candidates to the information storage 1. The details of each process will be described along with the internal structure of the operating procedure generation supporter 2.

The receptor 21 receives inputs of information related to instructions from the user or other systems to the operating procedure generation supporter 2. Input information will be described along with the details of the internal structure thereof. The receptor 21 then sends the input information to sections described later, according to the contents of the received information. Although the receptor 21 is supposed to receive all information here, each section described later may have a receptor 21.

The outputter 22 receives and outputs information that each section described later acquires or generates. The information may be output in the form of images or data in files. Although the outputter 22 is supposed to output all information here, each section described later may have an outputter 22.

The standard operating procedure (standard activity) acquirer 23 receives the specified class from the receptor 21 and acquires standard operating procedures associated with the specified class.

Figure 5:
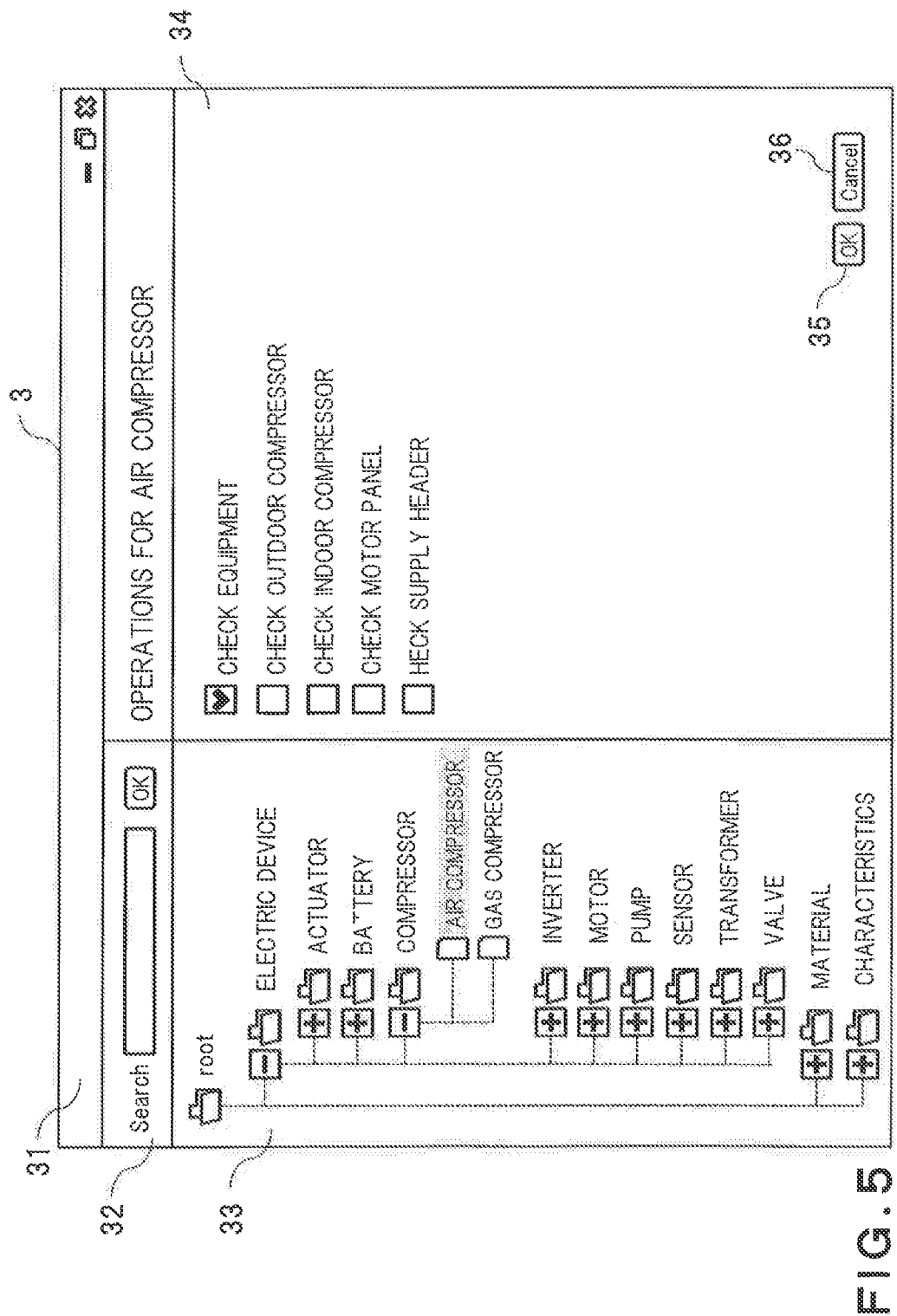
FIG. 5 is a diagram illustrating an example of an input screen.

The process in the standard operating procedure acquirer 23 will be described along with an input screen used for selecting the class to be processed. FIG. 5 is a diagram illustrating an example of an input screen. To accept a user operation, an input screen 3 illustrated in FIG. 5 may be displayed. The input screen 3 may be displayed by the act of the outputter 22 upon reception of input instructions at the receptor 21.

The input screen 3 is comprised of a window title 31, a search region 32, a product ontology structure display region 33, a standard operating procedure display region 34, an OK button 35, and a Cancel button 36. The window title 31 has various buttons for operating the window. The search region 32 has a text box and a confirm button for searching classes containing the specified keyword from the product ontology. The product ontology structure display region 33, which is the left column on the input screen 3, shows the classes in the product ontology illustrated in FIG. 2.

It should be noted that the classes of the product ontology may be acquired before or in displaying the input screen 3 from the information storage 1 through the receptor 21 or an acquirer not illustrated.

It should be noted that the structure of the input screen 3 in FIG. 5 is an example. The structure of the input screen 3 may be any other structure that can get information on the specified class. Information other than the above information may be given instead.

Information can be received without GUI such as the input screen 3. This also applies to the description below using the input screen 3.

The user specifies the class of a product to undergo operation from the product ontology structure display region 33. The class may be specified when it is selected or when the OK button 35 is pushed after the class is selected.

Upon reception of the specified class through the receptor 21, the standard operating procedure acquirer 23 acquires the operating procedure ontology from the information storage 1 and then acquires standard operating procedures associated with the specified class.

The standard operating procedure acquirer 23 outputs the acquired standard operating procedures through the outputter 22.

A list of standard operating procedures is shown in the standard operating procedure display region 34 which is the right column on the input screen 3 in FIG. 5.

In FIG. 5, "air compressor" is specified in the product ontology structure display region 33. Accordingly, five standard operating procedures associated with the "air compressor" class illustrated in FIG. 4: "check equipment", "check outdoor compressor", "check indoor compressor", "check motor panel", and "check supply header" are displayed in the standard operating procedure display region 34.

In this manner, the standard operating procedure acquirer 23 acquires the standard operating procedures of the specified class, based on the specified class. Thus, the user or the like can know the standard operating procedures just by specifying the product family which the operation target belongs to.

The property acquirer 24 receives a basic operating procedure specified from among the standard operating procedures of the specified class. Then, the property acquirer 24 acquires properties to be updated by (to be subjected to operate in) the basic operating procedure.

This will be described with reference to the input screen 3 in FIG. 5. The standard operating procedure acquirer 23 shows the standard operating procedures of the specified class in the standard operating procedure display region 34 on the screen 3. Afterwards, the user specifies the basic operating procedure from among the displayed standard operating procedures.

A basic operating procedure refers to an operation specified from among standard operating procedures and sent to the property acquirer 24. A basic operating procedure can also be an operation to be performed or actually performed on a product regarded as an operation target. For example, it is possible that a mandatory operation by the administrator or a currently performed operation is selected by the user as a basic operating procedure. However, this is not necessarily the case and any operation may be selected from the standard operating procedures. A basic operating procedure associated with the specified class may be registered to the operating procedure ontology.

As illustrated in FIG. 4, the standard operating procedures of the ancestor class of the specified class are also the standard operating procedures of the specified class. Thus, operations can be shared among ancestor and its descendant classes. For example, if the parent class has the experience of any operation, the standard operating procedure that has been performed on the product of the parent class can be selected as a basic operating procedure of the specified class (child class). When standard operating procedures are shared among ancestor and its descendant classes, it is possible to make use of the experiences of operation of the products in ancestor and its descendant classes for operations performed for other products in ancestor or its descendant classes. This is preferable also in that this can make use of data, for example, allows for the analysis of an operating history.

In FIG. 5, the checkbox of "check equipment" is on. This can happen if the user checks the checkbox of "check equipment" as a basic operating procedure among checkboxes of the standard operating procedures after the outputter 22 displays the standard operating procedures in the standard operating procedure display region 34. This can also happen if "check equipment" is already registered as the basic operating procedure of the class "air compressor" when the standard operating procedure acquirer 23 acquires the standard operating procedures and the basic operating procedure is sent to the outputter 22 in the forms distinguishable from other standard operating procedures.

The specification of a basic operating procedure may be done, for example, in such a manner that the checkboxes in the standard operating procedure display region 34 are checked or unchecked as described above and the OK button 35 is pushed for sending the standard operating procedure, whose checkbox is checked, to the receptor 21 as a basic operating procedure. Besides, pushing the Cancel button 36 may return the screen to the initial state.

If any basic operating procedure is pre-marked in the standard operating procedure display region 34, the checkbox of that basic operating procedure may be locked so that it cannot be unchecked.

Upon acquisition of the basic operating procedure through the receptor 21, the property acquirer 24 acquires activities related to the basic operating procedure and the sub activities of the activities from the operating procedure ontology. The property acquirer 24 then acquires properties associated with the acquired sub activities as illustrated in FIG. 4.

The property acquirer 24 acquires all properties of the specified class from the product ontology. Specified class selected at the time of sending the basic operating procedure may be sent with information on the basic operating procedure. Alternatively, the received specified class may be held at the receptor 21 and then sent to the property acquirer 24 along with the basic operating procedure.

The property acquirer 24 groups all properties of the specified class into two parts, one is associated properties and the other is non-associated properties. An associated property refers to a property to be updated by the acquired basic operating procedure, that is, a property regarded as the operation target of the basic operating procedure. A non-associated property refers to a property not to be updated by the acquired basic operating procedure, that is, a property not regarded as the operation target of the basic operating procedure.

The property acquirer 24 outputs the associated properties and the non-associated properties through the outputter 22. At this time, the associated properties and the non-associated properties are output in such forms that they can be distinguished.

FIG. 6 is a diagram illustrating an example of the output of properties. This output screen shows a property display region 37 replacing the standard operating procedure display region 34 in FIG. 5.

A list of the properties associated with the specified class "air compressor" is illustrated in the property display region 37. The checkboxes of the associated properties are on (checked). Consequently, "operation mode" and "operation time" enclosed by thick frames can be recognized as associated properties. The checkboxes of the non-associated properties are off (unchecked). In this manner, the associated properties and the non-associated properties may be distinguished from each other by checking and unchecking the checkboxes of the properties.

In this manner, the property acquirer 24 shows the associated properties regarded as the operation targets of the basic operating procedure and the non-associated properties not regarded as operation targets. Therefore, the user can determine whether it is possible to confirm all the properties that the user wants to confirm in the basic operating procedure.

The additional operating procedure candidate generator 25 receives specified properties specified from among the non-associated properties. Then, the additional operating procedure candidate generator 25 generates a list of standard operating procedures as additional operating procedure candidates, where values of the specified properties may be updated, from standard operating procedures included in the standard operating procedures of the specified class.

The specification of the property given to the receptor 21 may be performed through the operation on the screen illustrated in FIG. 6. For example, among the properties in the property display region 37 illustrated in FIG. 6, unchecked properties may be selected so that the selected properties can be recognized as specified properties. For example, when the checkboxes of three properties "voltage", "current", and "pressure at high-pressure air header" are checked and the OK button 35 is pushed, information on these three properties may be sent to the receptor 21. If any basic operating procedure is already registered to the operation ontology, the displayed checkboxes of the associated properties (in FIG. 6, "operation mode" and "operation time") of the basic operating procedure may be checked and unchangeable. Besides, pushing the Cancel button 36 may return the screen to the initial state.

It should be noted that the structure of the input screen 3 is an example. The structure of the input screen 3 may be any other structure that can get information on the specified properties. Information other than the specified properties may be given instead.

Upon acquisition of the specified properties through the receptor 21, the additional operating procedure candidate generator 25 acquires activities regarded as standard operating procedures for the specified class from the operating procedure ontology. The additional operating procedure candidate generator 25 then refers to the sub activities making up the activities and acquires properties to be updated through the sub activities. The additional operating procedure candidate generator 25 may then determine whether the acquired properties are the specified properties.

Since the specified classes are supposed to inherit the properties of their ancestor classes, the acquired activities may include the activities associated with the ancestor classes as illustrated in FIG. 4. Alternatively, the acquired activities may be limited to the activities associated with the properties of the specified class.

If there are properties depending on the associated properties (dependent properties) and the dependent properties are not checked in the basic operating procedure, activities in which the dependent properties are checked may be acquired and output as additional operating procedure candidates.

If the additional operating procedure candidate generator 25 acquires a plurality of additional operating procedure candidates, the priorities of the additional operating procedure candidates may be set. For example, a character or symbol indicating a high priority can be displayed along with each additional operating procedure candidate. Alternatively, the additional operating procedure candidates are listed in the order of priority such that extended operating procedures with higher proprieties can be shown in the upper portion.

The priorities may be freely determined. For example, the priority of each additional operating procedure candidate may be calculated by a predetermined scheme so that the additional operating procedure candidates can be output in the order of the priority. With one possible scheme for calculating priorities, calculation is performed based on the number of properties whose values are to be changed by the additional operating procedure candidates, among the plurality of specified properties. In this scheme, an additional operating procedure candidate associated with a larger number of properties to be updated is given a higher priority.

Figure 7:
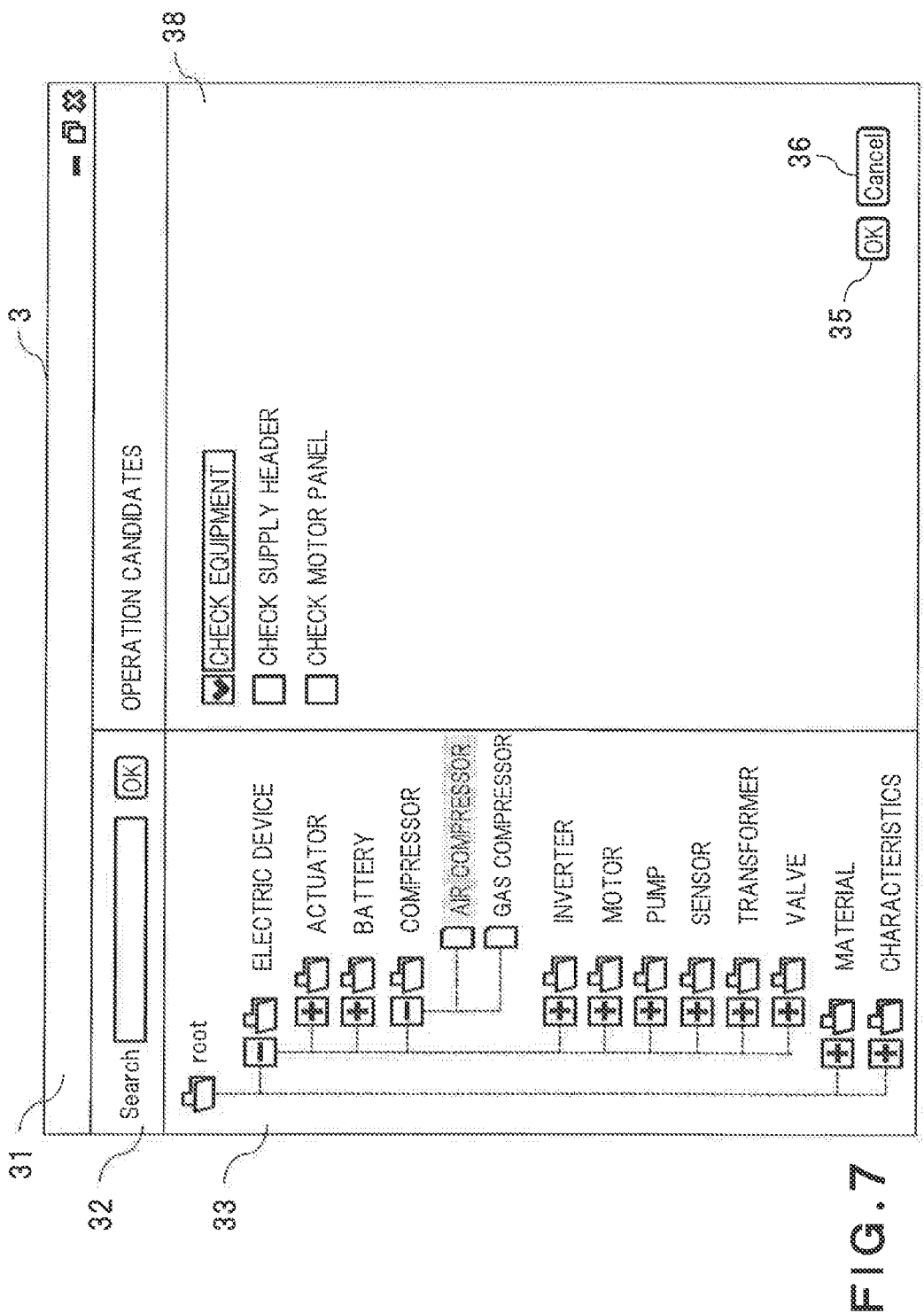
FIG. 7 is a diagram illustrating an example of the output of additional operating procedure candidates.

The outputter 22 outputs the additional operating procedure candidates sent from the additional operating procedure candidate generator 25. FIG. 7 is a diagram illustrating an example of the output of additional operating procedure candidates. This output screen shows an additional operating procedure candidate selection region 38 replacing the property display region 37 in FIG. 6.

The additional operating procedure candidate selection region 38 shows a list of the additional operating procedure candidates generated by the additional operating procedure candidate generator 25. FIG. 7 illustrates "check supply header" and "check motor panel". It should be noted that "check equipment" with a checked checkbox is already specified as a basic operating procedure. In this manner, any pre-specified basic operating procedure may be acquired from the receptor 21 or the standard operating procedure acquirer 23 and then be output along with the additional operating procedure candidates. The displayed checkbox of the basic operating procedure may be checked and unchangeable.

It should be noted that all specified properties can be confirmed by selecting only one of "check supply header" and "check motor panel". If all specified properties cannot be confirmed by selecting one operation, the notification that they cannot be confirmed by selecting one operation may be displayed or confirmable operations may be displayed for each property. When confirmable operations may be displayed for each property, the operations involving a larger number of properties may be regarded as a higher priority when the screen is displayed.

Since the additional operating procedure candidate generator 25 shows the standard operating procedures involving the specified properties as operation targets, even a user who does not know which items are to be confirmed in the standard operating procedures can easily select additional operations.

The extended operating procedure generator 26 receives the specified additional operating procedure candidates (specified additional operating procedures) and registers an extended operating procedure, which is a combination of the basic operating procedures and the specified additional operating procedures, to the information storage 1.

The specification of the extended operating procedure may be performed through the operation on the input screen 3 illustrated in FIG. 7. For example, among the standard operating procedures in the additional operating procedure candidate selection region 38 in FIG. 7, an unchecked standard operating procedure may be selected so that the selected standard operating procedure can be recognized as a specified additional operating procedure. For example, when the OK button 35 is pushed with the checkbox of "check supply header" left checked and with the checkbox of "check motor panel" left unchecked, the operation "check supply header" with the checked checkbox may be sent to the receptor 21 as a specified additional operating procedure. It should be noted that any basic operating procedure already specified may be sent to the receptor 21. Besides, pushing the Cancel button 36 may return the screen to the initial state.

It should be noted that the structure of the input screen 3 is an example. That means input screen 3 may form any other structure, as long as information about additional extended operating procedures can be obtained. Besides, information other than additional extended operating procedures may be given instead.

The extended operating procedure generator 26 combines the basic operating procedures and the specified additional operating procedure acquired through the receptor 21 and registers the combination to the information storage 1 as an extended operating procedure. In the above example, a combination of "check supply header" and "check equipment" is registered as an extended operating procedure. The extended operating procedure is registered to the operating procedure ontology, being associated with the specified class. During the subsequent operation in the operating procedure generation support apparatus, the extended operating procedure may be displayed in the standard operating procedure display region 34 on the input screen 3 as the extended operating procedure of the class.

The extended operating procedure is registered to the individual information, being associated with an operation target. For example, when the name of an object as operation target is "primary air compressor", the extended operating procedure is registered to the individual information as the extended operating procedure for "primary air compressor". A region to input the name of the operation target may be provided on the input screen 3. Alternatively, a screen on which the name of the operation target is entered may be output through the outputter 22 when the extended operating procedure generator 26 registers the extended operating procedure to the individual information. Thus, the operating procedure ontology and the individual information are updated.

It should be noted that not only the extended operating procedure but the basic operating procedures and the additional operating procedures may be individually registered.

The flow of a process related to the first embodiment will be explained using a flow chart. It should be noted that all flow charts which will be explained below are merely illustrative and used with no limitation.

For example, if the order of the steps of the process is changeable, it can be changed. The flow is supposed to start upon reception of an instruction at the receptor 21, which is not necessarily the case. For example, the flow may start when the receptor 21 refers to data stored in the information storage 1 at a predetermined time.

Figure 8:
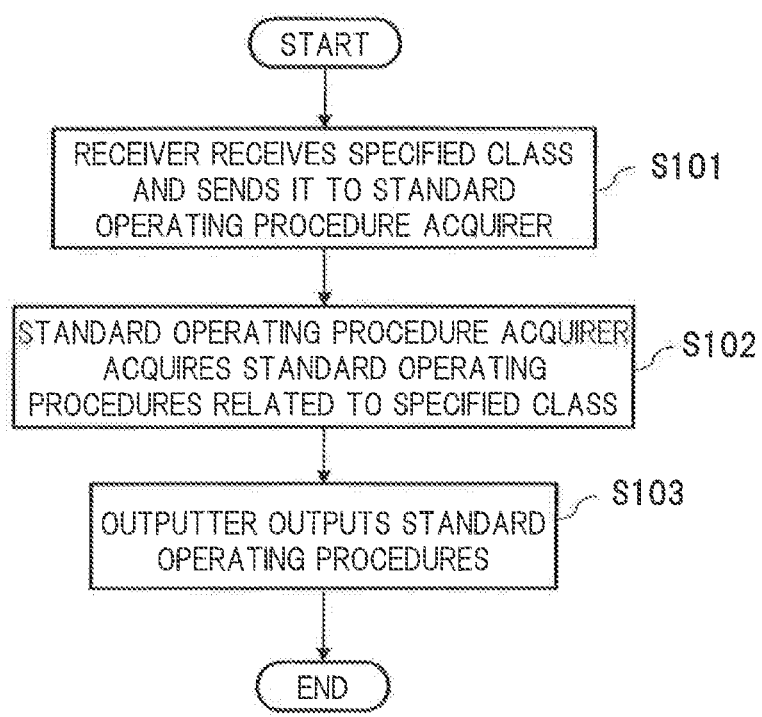
FIG. 8 is a flow chart of a process related to a standard operating procedure acquirer.

FIG. 8 is a flow chart of a process related to the standard operating procedure acquirer 23. The receptor 21 receives a specified class through, for example, the input screen 3. After determining that the acquired information is a specified class, the receptor 21 sends it to the standard operating procedure acquirer 23 (S101). The standard operating procedure acquirer 23 refers to the product ontology and the operating procedure ontology in the information storage 1 and acquires standard operating procedures associated with the specified class (S102). The standard operating procedure acquirer 23 sends the acquired standard operating procedures to the outputter 22. The outputter 22 outputs the standard operating procedures (S103).

Figure 9:
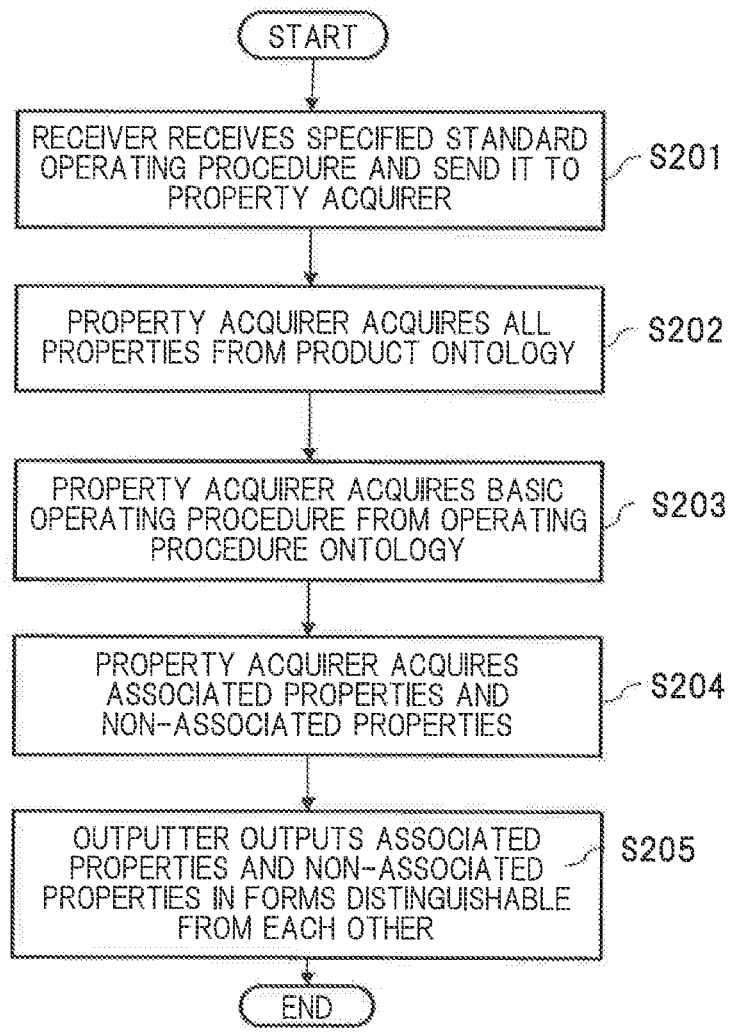
FIG. 9 is a flow chart of a process related to a property acquirer.

FIG. 9 is a flow chart of a process related to the property acquirer 24. The receptor 21 receives a basic operating procedure through, for example, the input screen 3. After determining that the acquired information is a basic operating procedure, the receptor 21 sends it to the property acquirer 24 (S201). The property acquirer 24 acquires all properties of the specified class from the product ontology in the information storage 1 (S202). The property acquirer 24 acquires information on the basic operating procedure from the operating procedure ontology stored in the information storage 1 (S203).

The property acquirer 24 refers to an activity regarded as the basic operating procedure and all the sub activities thereof. The property acquirer 24 then acquires associated properties, which are the properties of the specified class and whose values are changed by the execution of the referred activities and sub activities. Among all properties, properties which are not associated properties are regarded as non-associated properties (S204).

The property acquirer 24 sends the associated properties and the non-associated properties to the outputter 22.

Concurrently, other data such as mark allowing for a distinction between the associated properties and the non-associated properties are sent. The outputter 22 outputs the associated properties and the non-associated properties with added marks allowing for a distinction between the associated properties and the non-associated properties according to the flags (S205).

Figure 10:
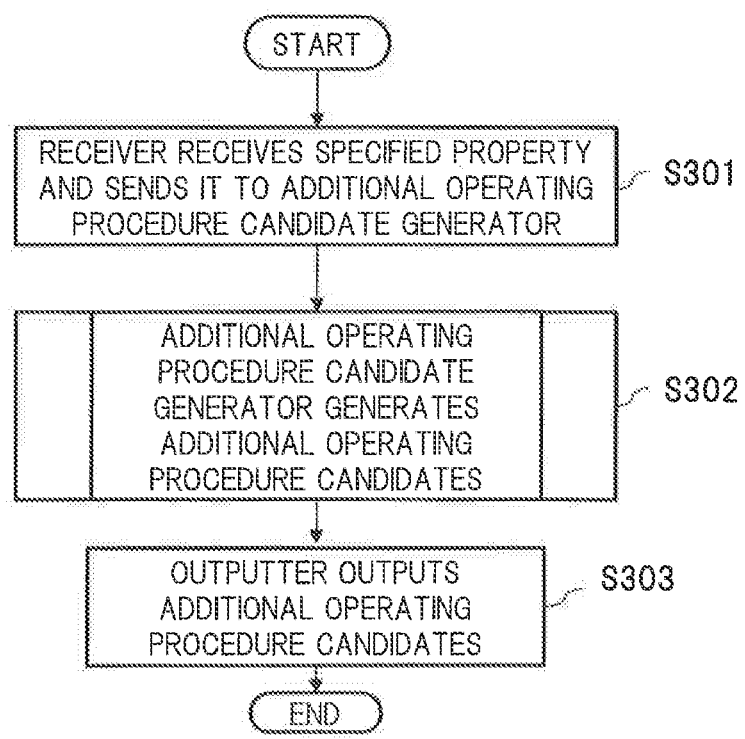
FIG. 10 is a flow chart of a process related to an additional operating procedure candidate generator.

FIG. 10 is a flow chart of a process related to the additional operating procedure candidate generator 25. The receptor 21 receives specified properties through, for example, the input screen 3. After determining that the acquired information is specified properties, the receptor 21 sends them to the additional operating procedure candidate generator 25 (S301). The additional operating procedure candidate generator 25 performs an additional operating procedure candidate generating process (S302). The outputter 22 then outputs additional operating procedure candidates (S303).

Figure 11:
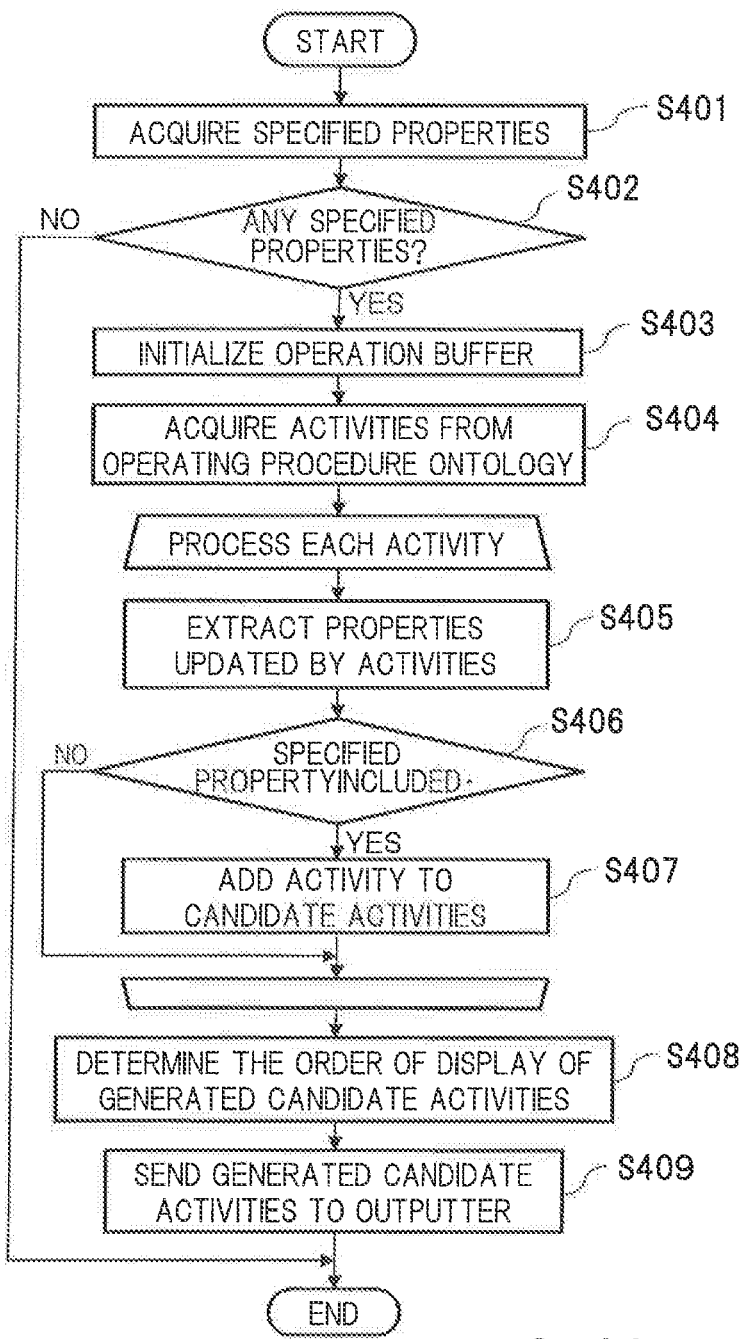
FIG. 11 is a flow chart of an additional operating procedure candidate generating process in the additional operating procedure candidate generator.

The details of S302 that is the additional operating procedure candidate generating process will now be explained. FIG. 11 is a flow chart of the additional operating procedure candidate generating process in the additional operating procedure candidate generator 25. The additional operating procedure candidate generator 25 receives specified properties (S401). Here, it is possible that there is no property that the user wants to additionally check and the OK button 35 on the input screen 3 is pushed with nothing selected, resulting in no specified property. If there is no specified property (NO in S402), the process terminates. If there are one or more specified properties (YES in S402), operation buffer for storing operation candidates is initialized (S403).

The additional operating procedure candidate generator 25 then acquires activities from the operating procedure ontology in the information storage 1 (S404). Each acquired activity undergoes processing in S405 to S407 explained below. First, the properties updated by the activities and the sub activities thereof are acquired (S405). The additional operating procedure candidate generator 25 determines whether or not the acquired properties include any specified property. If no (NO in S406), the process proceeds to the process of the next activity. If yes (YES in S406), the corresponding activity is added to the operation buffer (S407). Upon completion of the process of all of these activities, the activities contained in the operation buffer with high proprieties are determined, and the order of output (the order of priority) is then determined (S408). The activities contained in the operation buffer are then sent to the outputter 22 as additional operating procedure candidates, in the order of priority (S409).

Figure 12:
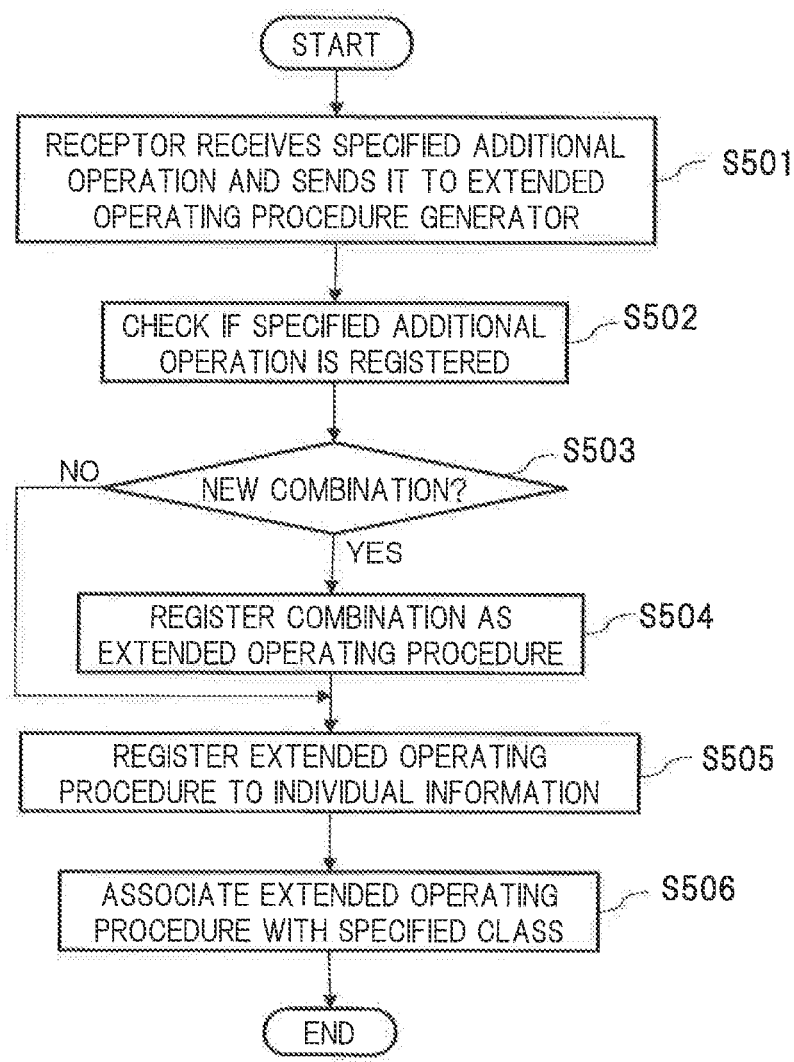
FIG. 12 is a flow chart of an additional operating procedure candidate generating process in the extended operating procedure generator.

FIG. 12 is a flow chart of a process related to the extended operating procedure generator 26. The receptor 21 receives a specified additional operating procedure through, for example, the input screen 3, determines that the acquired information is a specified additional operating procedure, and sends them to the extended operating procedure generator 26 (S501). The extended operating procedure generator 26 refers to the information storage 1 to check if a combination of the basic operating procedures and the specified additional operating procedure is already registered thereto as an extended operating procedure (S502).

If no extended operating procedure of the same combination is registered to the information storage 1, that is, if the combination is new (YES in S503), the combination is registered to the information storage 1 as an extended operating procedure (S504). In contrast, if the same combination is already registered, that is, if the combination is not new (NO in S503), the process of S504 is skipped.

The extended operating procedure generator 26 then registers the registered extended operating procedure to the individual information on the operation target (S505). The registered extended operating procedure is associated with the specified class.

As explained above, according to the first embodiment, even if a user does not know the information such as standard operating procedures for an operation target and properties to be checked by operations, the user can recognize the standard operating procedures and the properties of the product family by specifying the product family. Further, when a user wants to additionally confirm any property, the user can recognize the standard operating procedures related to the property by specifying the property. Further, an extended operating procedure that is a combination of standard operations is easily generated. Since the extended operating procedure is a combination of standard operations, the quality ensured by the standard operations is maintained.

Second Embodiment

Figure 13:
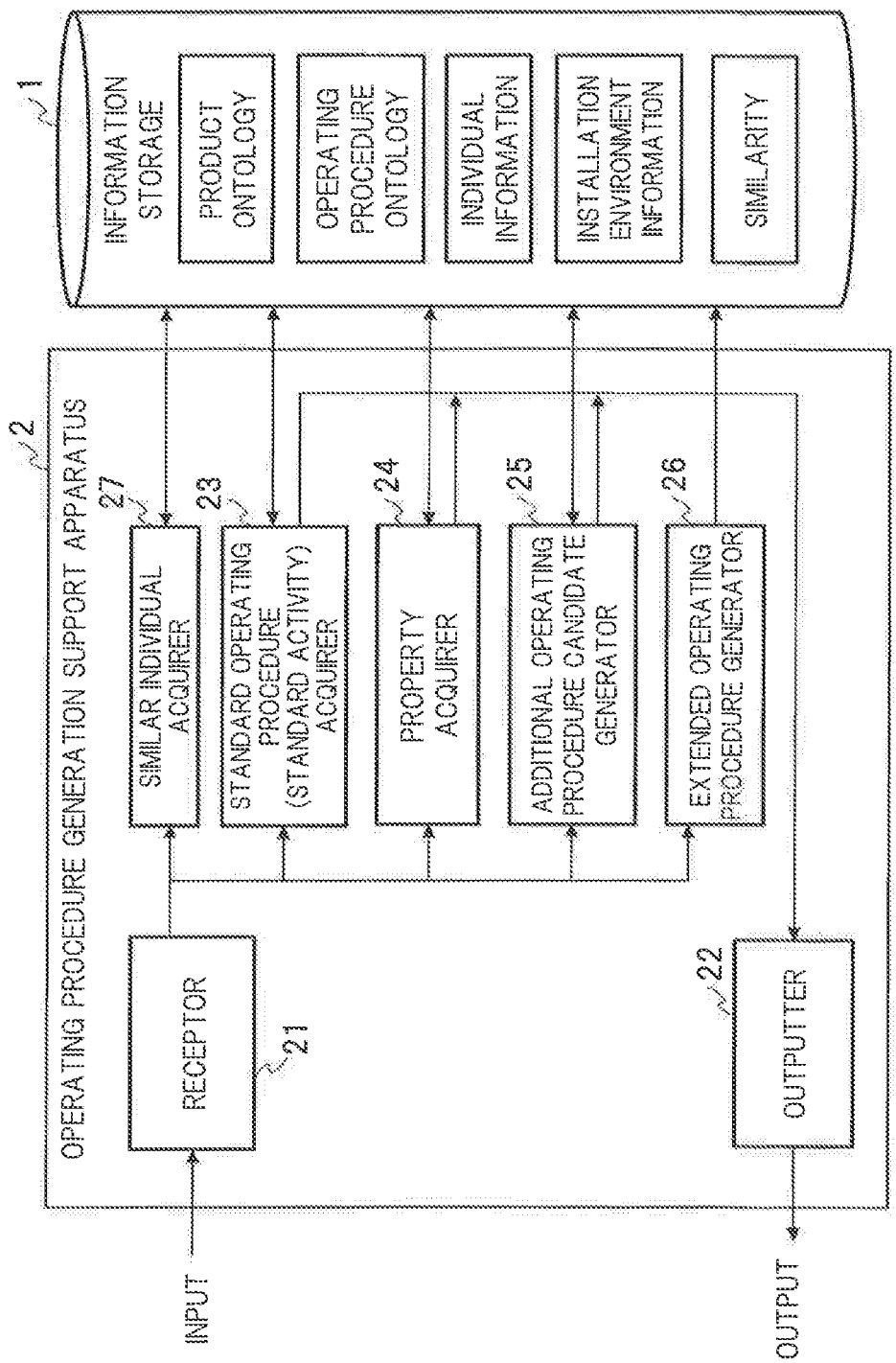
FIG. 13 is a block diagram schematically illustrating the structure of an operating procedure generation support apparatus according to the second embodiment.

FIG. 13 is a block diagram schematically illustrating the structure of an operating procedure generation support apparatus according to the second embodiment. The operating procedure generation support apparatus according to the second embodiment differs from that according to the first embodiment in that the operating procedure generation supporter 2 therein further includes a similar individual acquirer 27. The description of the points similar to those in the first embodiment will be omitted.

The similar individual acquirer 27 acquires an individual similar to the specified operation target. Information on the similar individual is referred when additional operating procedure candidates are proposed. For example, if the additional operating procedure candidates include any basic operating procedure or extended operating procedure of the similar individual registered to individual information by the extended operating procedure generator 26 before, the extended operating procedure may be preferentially displayed.

Moreover, when outputting the acquired standard operating procedures, the standard operating procedure acquirer 23 may preferentially output the standard operating procedures corresponding to the basic operating procedure or extended operating procedures of the similar individual. Moreover, when outputting the acquired properties, the property acquirer 24 may preferentially output the non-associated properties updated by the basic operating procedure or extended operating procedures of the similar individual among the non-associated properties.

For example, "check supply header" and "check motor panel" are illustrated in the above-described additional operating procedure candidate selection region 38 in FIG. 7. In this case, if "check motor panel" is included in the extended operating procedure of the similar individual, "check motor panel" may be determined as a higher priority and displayed in the upper position than "check supply header".

The similar individual acquirer 27 may simply determine an individual in the same class as the specified class as a similar individual. Alternatively, the similar individual acquirer 27 may receive information on the specified operation target through the receptor 21 and calculate the similarities of the individuals registered to the individual information or the installation environment information according to the information through the receptor 21. According to the similarities, the similar individual acquirer 27 may determine whether or not the individuals are similar to the specified operation target. For example, the individual having a similarity exceeding a predetermined threshold is determined as being similar to the specified operation target.

For example, if the name of the operation target or the like is already registered to the individual information, upon reception of the name of the operation target through the receptor 21, the similar individual acquirer 27 acquires the actual values of the properties of the operation target from the individual information. The similar individual acquirer 27 may then refer to the values of the properties of a comparative product, for example, a product that is in the same class as the specified operation target and registered to the individual information, and calculate the similarities based on the differences between the referred values of the properties. In the case that the product is a computer, the values of the properties can be, for example, a CPU clock frequency, a memory capacity, and other values.

Alternatively, the similarities may be calculated based on the installation environment information. The installation environment information may be the installation positions, ages of service, and installation conditions (temperature, humidity, and the like) of the comparative objects.

In the case where BIM data which is three-dimensional information modeling of buildings is stored as installation environment information, information on various properties contained in the BIM data may be used. Use of BIM data allows a similar individual to be easily or accurately acquired.

It should be noted that the comparative individual is not necessarily in same class as the operation target and may be in the ancestor or descendant class of the operation target. For example, since properties are inherited from ancestor classes to descendant classes, even the comparative individual in the descendant class of the operation target has part of properties in common with the specified operation target. Thus, comparison can be performed based on these properties in common.

The method of calculating the similarities and the comparative items may be predetermined and stored in the similar individual acquirer 27. Alternatively, the method of calculating similarities and the comparative individual may be sent to the similar individual acquirer 27 through the receptor 21 along with an instruction to calculate the similarities.

Information on the acquired similar individual is used when the additional operating procedure candidate generator 25 determines the display order of the generated additional operating procedure candidates. Not only the additional operating procedure candidate generator 25 but the standard operating procedure acquirer 23 and the property acquirer 24 may determine the display order of output information according to information on the similar individual and send it to the outputter 22.

Information on the similar individual and the similarities may be stored in the information storage 1 and referred by each section. Alternatively, the similar individual acquirer 27 may directly send information on the similar individual and the similarities to each section.

Figure 14:
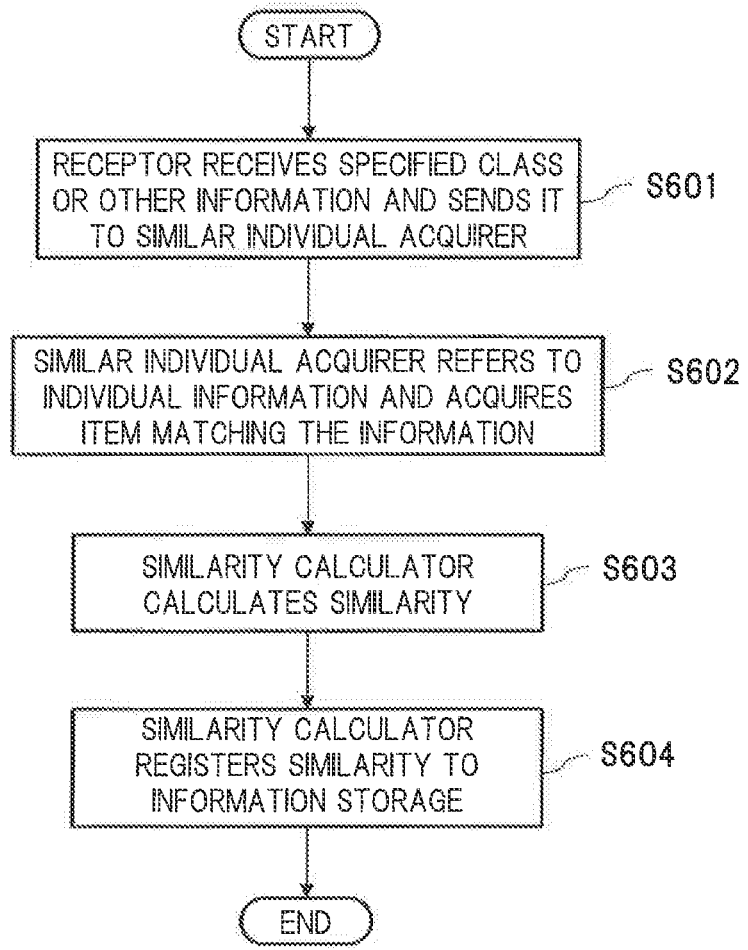
FIG. 14 is a flow chart of a process related to a similar individual acquirer.

FIG. 14 is a flow chart of a process related to the similar individual acquirer 27. The receptor 21 receives a specified class, a basic operating procedure, or a specified property (S601). This information received by the receptor 21 is sent to each section and the similar individual acquirer 27. The similar individual acquirer 27 refers to the individual information in the information storage 1 and acquires an individual matching the received information (S602). For example, upon reception of a specified class, the similar individual acquirer 27 acquires the individual in the same class as the specified class, from the individual information. The similar individual acquirer 27 calculates similarity for the acquired individual, according to a predetermined property, a specified property before the calculation and an object in the installation environment information (S603). The similar individual acquirer 27 determines whether the individual is similar to the specified operation target or not according to the calculated similarity and acquires a similar individual (S604).

As described above, according to the second embodiment, the display order of output results can be determined by reference to information on a similar individual (operation target), reducing the load on the user when the user selects input information.

Further, each process in the embodiments described above can be realized by software (program). Therefore, the operating procedure generation support apparatus 1 in the above embodiments can be implemented, for example, by using a general-purpose computer device as basic hardware and instructing a processor mounted on the computer device to execute a program.

Figure 15:
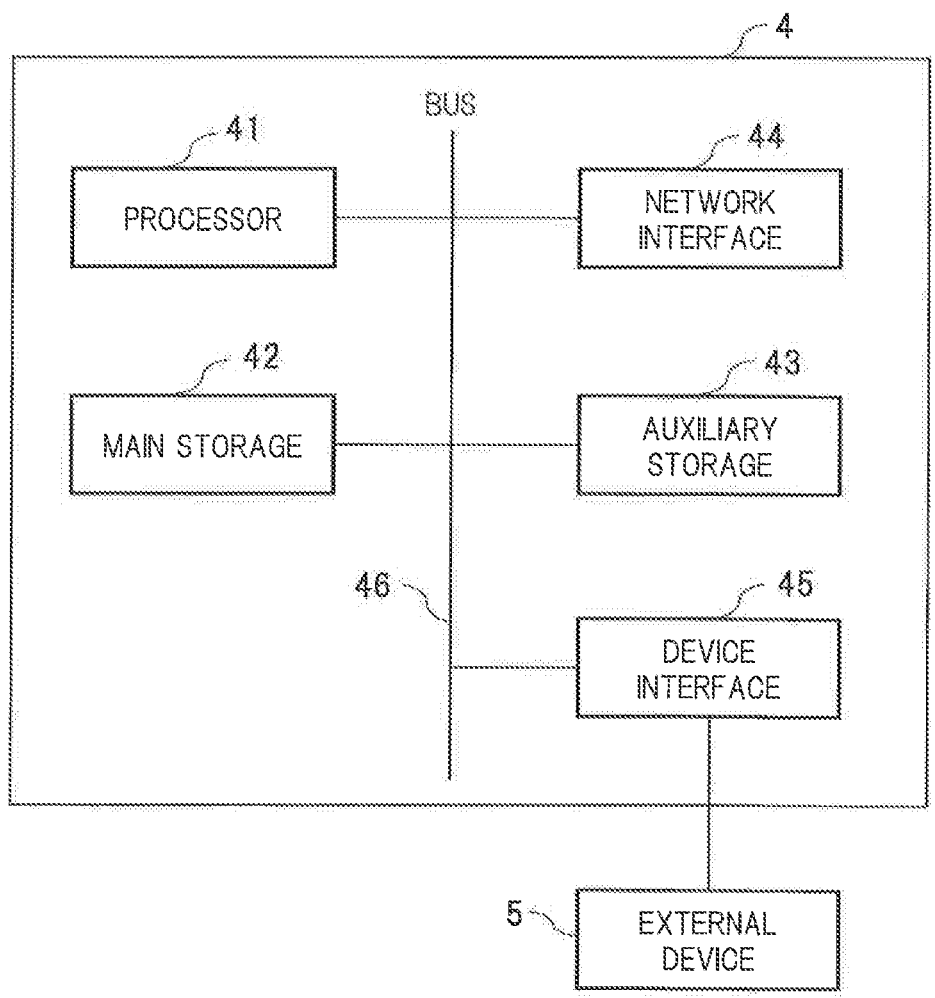
FIG. 15 is a block diagram illustrating the structure of hardware according to one embodiment of the present invention.

FIG. 15 is a block diagram illustrating the structure of hardware according to one embodiment of the present invention. The operating procedure generation support apparatus can be implemented in the form of a computer device 4 including a processor 41, a main storage 42, an auxiliary storage 43, a network interface 44, and a device interface 45, which are connected to one another via a bus 46.

The processor 41 reads a program from the auxiliary storage 43, expands it in the main storage 42, and executes it, thereby implementing the function in the operating procedure generation supporter 2.

The operating procedure generation support apparatus according to this embodiment may be implemented by pre-installing a program, which is to be executed in the operating procedure generation support apparatus, in the computer device 4, by storing the program in a CD-ROM or other storages, or by distributing the program via a network so that the program can be installed in the computer device 4 anytime.

The network interface 44 is an interface for connection to a communication network. To achieve wireless connection to the information storage 1 and the like, this network interface 44 may be used.

The device interface 45 is an interface for connection to an external device 5 or other equipment. The external device 5 may be any storage or recording medium, such as an HDD, a CD-R, a CD-RW, a DVD-RAM, a DVD-R, or an SAN (storage area network). The information storage 1 may be implemented as a database or database table and connected to the device interface 45 as an external device 5.

The device interface 45 may be connected to an external device 5 including a display device, such as a liquid crystal display (LCD) or a cathode ray tube (CRT), and an input device, such as a keyboard or mouse.

Input to the receptor 21 and output from the outputter 22 may be done through such an external device 5. Operation signals generated by the operation of the input device in the external device 5 are output to the processor 51.

The main storage 42 is a memory that temporarily stores instructions to be executed by the processor 41 and other various data, and may be a volatile memory, such as an SRAM or a DRAM, or a nonvolatile memory, such as a flash memory or an MRAM. The auxiliary storage 43 is a storage that permanently stores programs and data and may be an HDD or an SSD, for example. Data acquired and generated by the operating procedure generation supporter 2 may be stored in the main storage 42, the auxiliary storage 43, and the external device 5, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An operating procedure generation support apparatus comprising:
   a graphic user interface including a user input device and an output display;
   an operation buffer;
   a memory storing instructions; and
   a processor configured to execute the stored instructions to perform a method comprising:
      receiving, via the user input device, a user selection indicating a product family;
      acquiring product description specifications of the product family and its associated properties;
      receiving standard operating procedures pre-associated with the product family and the associated properties;
      acquiring a basic operating procedure specified from among the standard operating procedures;
      acquiring non-associated properties, according to the product description specification, the non-associated properties being the properties of the product family and having values not updated by the basic operating procedure; and
      outputting additional operating procedure candidates by:
         acquiring, via the user input device, a user specification of one or more properties from among the non-associated properties;
         acquiring activities as the additional operating procedure candidates, according to the product description specifications, the standard operating procedures, and the properties specified from among the non-associated properties, the additional operating procedure candidates being capable of updating values of the specified properties;
         adding the additional operating procedure candidates to the operation buffer;

determining an order of priority of the additional operating procedure candidates based on reference to information on an operation target; and outputting the additional operating procedure candidates from the operation buffer to the display in the order of priority, such that the additional operating procedures with the highest priorities are displayed in an upper-most portion of the display.

2. The operating procedure generation support apparatus according to claim 1, the processor further performs the method comprising:
acquiring associated properties being the properties of the product family and having values updated by the basic operating procedure, and
outputting the associated properties and the non-associated properties in the forms distinguishable from each other.

3. The operating procedure generation support apparatus according to claim 1, the processor further performs the method comprising:
associating an additional operating procedure, specified from among the additional operating procedure candidates, with the basic operating procedure and register the additional operating procedure together with the product family or a specified name.

4. The operating procedure generation support apparatus according to claim 1, the processor further performs the method comprising:
acquiring the standard operating procedures related to the specified product family, according to the product description specifications, the standard operating procedures, and the specified product family; and
determining the standard operating procedure specified from among the standard operating procedures acquired as the basic operating procedure.

5. The operating procedure generation support apparatus according to claim 1, wherein the product family is one of a plurality of product families with hierarchy, and
the standard operating procedures related to the product family in a descendant class include the standard operating procedures of the product family in an ancestor class.

6. The operating procedure generation support apparatus according to claim 1, the processor further performs the method comprising:
determining according to the product family of a specified first operation target, the values of the properties, or installation environments, whether an operation target other than the first operation target is similar to the first operation target and acquire operating procedure of a second operation target determined to be similar to the first operation target-displaying preferentially the operating procedure of the second operation target among the additional operating procedure candidates.

7. The operating procedure generation support apparatus according to claim 6, wherein the processor uses building information modeling (BIM) data to acquire the second operation target according to the installation environments.

8. An operating procedure generation support method performed by a computer having a graphic user interface including a user input device and an output display, an operation buffer, a memory storing instructions, and a processor configured to execute the stored instruction to perform the method, comprising:
receiving, via the user input device, a user selection indicating a product family;
acquiring product description specifications of the product family and properties of the product family;
receiving standard operating procedures pre-associated with the product family and the associated properties;
acquiring a basic operating procedure specified from among the standard operating procedures;
acquiring non-associated properties, according to the product description specification, the non-associated properties being the properties of the product family and having values not updated by the basic operating procedure; and
outputting additional operating procedure candidates by:
acquiring, via the user input device, a user specification of one or more properties from among the non-associated properties;
acquiring procedures activities as the additional operating procedure candidates, according to the product description specifications, the standard operating procedures, and the properties specified from among the non-associated properties, additional operating procedure candidates being capable of updating values of the specified properties;
adding the additional operating procedure candidates to the operation buffer;
determining an order of priority of the additional operating procedure candidates based on reference to information on an operation target; and
outputting the additional operating procedure candidates from the operation buffer to the output display in the order of priority, such that the additional operating procedures with the highest priorities are displayed in an upper-most portion of the display.

9. A non-transitory computer readable medium having a computer program stored therein which causes a computer having a graphic user interface including a user input device and an output display, an operation buffer, and a processor, when executed by the processor, to perform steps comprising:
receiving, via the user input device, a user selection indicating a product family;
acquiring product description specifications of the product family and associated properties of the product family;
receiving standard operating procedures pre-associated with the product family and the associated properties;
acquiring a basic operating procedure specified from among the standard operating procedures;
acquiring non-associated properties, according to the product description specification, the non-associated properties being the properties of the product family and having values not updated by the basic operating procedure; and
outputting additional operating procedure candidates by:
acquiring, via the user input device, a user specification of one or more properties from among the non-associated properties;
acquiring activities as the additional operating procedure candidates, according to the product description specifications, the standard operating procedures, and the properties specified from among the non-associated properties, additional operating procedure candidates being capable of updating values of the specified properties;
adding the additional operating procedure candidates to the operation buffer;

determining an order of priority of the additional operating procedure candidates based on reference to information on an operation target; and outputting the additional operating procedure candidates from the operation buffer to the output display in the order of priority, such that the additional operating procedures with the highest priorities are displayed in an upper-most portion of the display.

10. The operating procedure generation support apparatus according to claim 1, wherein the properties refer to items to be checked of a product belonging to the product family;

the non-associated properties refer to properties not to be checked by the basic operating procedure; and the additional operating procedure candidates refer to standard operating procedures where the specified properties are checked.

\* \* \* \* \*